United States Patent [19]

Hess et al.

[11] Patent Number: 5,405,915
[45] Date of Patent: Apr. 11, 1995

[54] ETHYLENE POLYMER COMPOSITIONS

[75] Inventors: Kevin J. Hess; Kiplin D. Cowan, both of Bartlesville, Okla.

[73] Assignee: Phillips Petroleum Company, Bartlesville, Okla.

[21] Appl. No.: 266,296

[22] Filed: Jun. 27, 1994

[51] Int. Cl.$^6$ ............................................. C08F 8/00
[52] U.S. Cl. .................................... 525/290; 525/313; 525/314; 525/315; 525/297
[58] Field of Search ............... 525/290, 313, 314, 315, 525/297

[56] References Cited

U.S. PATENT DOCUMENTS

| | | | |
|---|---|---|---|
| 3,965,054 | 6/1976 | Nojiri et al. | 260/25 HA |
| 4,115,508 | 9/1978 | Hughes | 264/310 |
| 4,267,080 | 5/1981 | Yokoyama et al. | 260/4 R |
| 4,440,893 | 4/1984 | Kallenback et al. | 524/305 |
| 4,506,061 | 3/1985 | Makino et al. | 526/142 |
| 4,525,516 | 6/1985 | Garcia et al. | 524/380 |
| 4,661,552 | 4/1987 | Kallenback | 524/433 |
| 4,668,461 | 5/1987 | Needham | 264/310 |
| 4,788,019 | 11/1988 | Kallenbach | 264/122 |
| 4,857,257 | 8/1989 | Chen | 264/310 |
| 4,868,264 | 9/1989 | Evens et al. | 526/336 |
| 4,900,706 | 2/1990 | Sasaki et al. | 502/116 |
| 4,940,682 | 7/1990 | Sasaki et al. | 502/113 |
| 5,017,635 | 5/1991 | Senuma et al. | 524/269 |

*Primary Examiner*—Bernard Lipman
*Attorney, Agent, or Firm*—Carl D. Corvin

[57] ABSTRACT

An ethylene polymer composition is provided that comprises: (a) an ethylene polymer (b) a crosslinking agent; and (c) a non-aromatic, cyclic, unsaturated, crosslinking co-agent.

10 Claims, No Drawings

ETHYLENE POLYMER COMPOSITIONS

BACKGROUND OF THE INVENTION

This invention is related to the field of ethylene polymer compositions. In particular, this invention is related to the field of crosslinked ethylene polymer compositions.

There has been, and continues to be, considerable interest in converting thermoplastic ethylene polymer compositions into thermosetting ethylene polymer compositions. This interest is due to the desire to combine the low cost, easy processing, and good mechanical properties of thermoplastic ethylene polymer compositions with the enhanced form stability at elevated temperatures, resistance to stress crack, and good tensile properties of thermosetting ethylene polymer compositions. Crosslinked ethylene polymer compositions are valuable because they can be used in the wire, cable, pipe, hose, and molded article industries.

Thermosetting ethylene polymer compositions are crosslinked by either chemical means or by radiation means. Currently, chemical crosslinking with organic peroxides is a preferred commercial approach. However, this approach has several drawbacks. One drawback is that organic peroxides can produce lower molecular weight radicals. These radicals can remove hydrogen atoms from an ethylene polymer and form low-boiling-point compounds. These low-boiling-point compounds can cause bubbles to form during the crosslinking reaction thereby adversely affecting the properties of the final ethylene polymer. This bubble drawback can be overcome to some extent by using a crosslinking co-agent that reduces bubble formation.

Crosslinking co-agents also have drawbacks. Currently, several commercial processes use aromatic-ring-containing, crosslinking co-agents. In particular, triallyl cyanurate (hereafter "TAC") has been used in several commercial processes. However, the use of TAC as a crosslinking co-agent has several drawbacks. One drawback is that the use of TAC is undesirable from a quality-control viewpoint. This is because the crosslinking efficiency is not consistent when using TAC. This means that a crosslinked product produced by using TAC can have widely varying physical properties. This is of particular concern in relation to the tensile properties of a crosslinked ethylene polymer composition.

Tensile properties are perhaps the most important indicators of the useful strength of a crosslinked ethylene polymer composition. For example, the tensile property known as "Percent Elongation at Break" is a good indicator of the brittleness of an ethylene polymer composition and the tensile property known as the "Strain Energy at Break" is a good indicator of the general toughness of an ethylene polymer composition. These properties are widely known and can be determined on commercially available test equipment. When TAC is used to produce a crosslinked ethylene polymer composition, these two tensile properties can vary widely thereby causing serious problems, in the area of quality control, for the producer.

This invention provides a solution to this problem of quality control.

SUMMARY OF THE INVENTION

It is an object of this invention to provide an ethylene polymer composition that is crosslinkable.

It is another object of this invention to provide a crosslinkable ethylene polymer composition that has consistent tensile properties when comparing one sample of a composition to another sample of a composition.

In accordance with this invention an ethylene polymer composition is provided that comprises (a) an ethylene polymer (b) a crosslinking agent; and (c) a non-aromatic, cyclic, unsaturated, crosslinking co-agent.

These and other objects, features, aspects, and advantages of this invention will become better understood with references to the following detailed description of the invention and the claims.

DETAILED DESCRIPTION OF THE INVENTION

The ethylene polymer used in the inventive composition is selected from the group consisting of homopolymers of ethylene and copolymers of ethylene and an alpha-olefin hydrocarbon having from 3 to about 18 carbon atoms. When the ethylene polymer is a copolymer, it is preferred if the alpha-olefin is selected from the group consisting of 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, and 1-decene. Additionally, when the ethylene polymer is a copolymer, it is preferred if the copolymer comprises from about 80 to about 99 percent by weight ethylene.

The ethylene polymer of the composition preferably has a density in the range of from about 0.92 to about 0.98 $g/cm^3$ as determined by ASTM D 1505. However, it is more preferred when the ethylene polymer has a density in the range of from about 0.94 to about 0.97 $g/cm^3$ as determined by the above method. The ethylene polymer preferably has a melt index of at least 5, more preferably in the range of from about 10 to about 30 dg/min. as determined by ASTM D1238, Condition 190/2.16. Most preferably, the ethylene polymer has a melt index in the range of from 15 to 30 dg/min. as determined by the above method.

These ethylene polymers can be polymerized by any known method in the art. However, it is preferred if the ethylene polymers are polymerized by using titanium halide catalysts. Titanium halide catalysts disclosed in U.S. Pat. Nos. 4,325,837; 4,326,988; 4,328,121; 4,363,746; 4,391,736; 4,406,818; 4,410,671; and 4,461,882 (the disclosures of which are hereby incorporated by references) are particularly preferred because they can produce ethylene polymer compositions that have very low amounts of catalyst residues. Typically, these catalyst residuals are less than 50 parts per million by weight, however, amounts as low as 10 parts per million by weight are not difficult to achieve. When titanium chloride based catalyst systems are used, it is preferred if the amount of chloride residues is less than 20 parts per million by weight. This eliminates the need for acid scavengers such as Group IIA or Group IIB metal compounds. These metal compounds are usually metal stearates, oxides, hydroxides, formates, acetates, alcoholates, and gycolates. The elimination of these metal compounds provides a further cost savings in the extremely competitive world-wide ethylene polymer market.

The crosslinking agent can be any suitable crosslinking agent for crosslinking ethylene polymers. However, it is preferred if the crosslinking agent is an organic peroxide crosslinking agent. For example, diperoxy compounds can be employed as the cross-linking agents of the composition of the present invention. Examples of diperoxy compounds suitable for use as the crosslinking agents include acetylenic diperoxy compounds such as hexynes having the formula

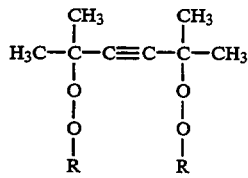

octynes having the formula

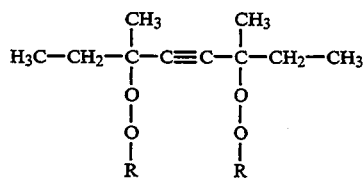

and octadiynes having the formula

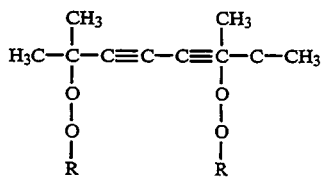

wherein R is selected from the group consisting of tertiary alkyl, alkyl carbonate, and benzoate. The molecular weights of the compounds are generally in the range of from about 200 to about 600. Examples of acetylenic diperoxy compounds described above include:
2,7-dimethyl-2,7-di(t-butylperoxy) octadiyne-3,5;
2,7-dimethyl-2,7-di(peroxy ethyl carbonate) octadiyne-3,5;
3,6-dimethyl-3,6-di(peroxy ethyl carbonate) octyne-4;
3,6-dimethyl-3,6-di(t-butylperoxy) octyne-4;
2,5-dimethyl 2,5-di(peroxybenzoate) hexyne-3;
2,5-dimethyl-2,5-di(peroxy-n-propyl carbonate) hexyne-3;
2,5-dimethyl-2,5-di (peroxy isobutyl carbonate) hexyne-3;
2,5-dimethyl-2,5-di(alpha-cumyl peroxy) hexyne-3;
2,5-dimethyl-2,5-di(peroxy ethyl carbonate) hexyne-3;
2,5-dimethyl-2,5-di(peroxy beta-chloroethyl carbonate) hexyne-3; and
2,5-dimethyl-2,5-di(t-butylperoxy) hexyne-3.

Other diperoxy compounds suitable for use as the crosslinking agent of the composition of the ;present invention include hexanes having the formula

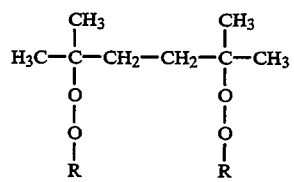

and octanes having the formula

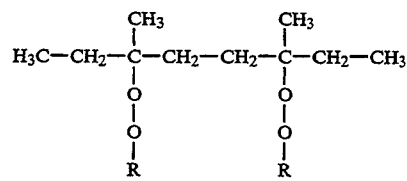

wherein R is selected from the group consisting of tertiary alkyl, alkyl carbonate, and benzoate. The molecular weights of the compounds are generally in the range of from about 200 to about 600. Examples of diperoxy compounds described above include:
3,6-dimethyl-3,6-di(t-butylperoxy) octane;
3,6-dimethyl-3,6-di(peroxy ethyl carbonate) octane;
2,5-dimethyl-2,5-di(peroxybenzoate) hexane;
2,5-dimethyl-2,5-di(peroxy isobutyl carbonate) hexane; and
2,5-dimethyl-2,5-di(t-butylperoxy) hexane.

Preferably, the diperoxy compound employed as the crosslinking agent of the composition of the present invention is selected from the group consisting of 2,5-dimethyl-2,5-di(t-butylperoxy) hexyne-3 and 2,5-dimethyl-2,5-di(t-butylperoxy) hexane. Other suitable examples of crosslinking agents are disclosed in U.S. Pat. Nos. 3,214,422 and 4,440,893 the entire discloses of which are hereby incorporated by reference.

The crosslinking agent is present in the composition in an amount in the range of from about 0.1% to about 3% by weight of the composition. Preferably, the crosslinking agent is present in the composition in an amount in the range of from about 0.2% to about 2% by weight of the composition. More preferably, the crosslinking agent is present in the composition in an amount in the range of from 0.5% to 1% by weight of the composition.

The crosslinking co-agents useful in this invention are those compounds that are: (1) non-aromatic, (2) cyclic, and (3) unsaturated. These compounds usually have from 4 to 60 carbon atoms in their structure. However, it is preferred if there are from 6 to 40 carbon atoms in their structure. These compounds should have at least one unsaturated carbon-carbon bond. However, polyunsaturated compounds are more preferred for crosslinking efficiency. In general, the formula for these compounds is $C_nH_{2(n-x)}R$ where "n" is an integer from 4 to 60; "x" is an integer from 1 to (n−1) and "x" is the number of unsaturated carbon-carbon double bonds; and R can be any group that does not interfere with the crosslinking reaction. Suitable compounds are cyclopentene, cyclohexene, cycloheptene, cyclooctene, cyclononene, cyclodecene, 1,3-cyclohexadiene, 1,4-cyclohexadiene, 1,3-cycloheptadiene, 1,5-cyclooctadiene, 1,5-cyclononadiene, dicyclopentadiene, cycloheptatriene, 1,5,9-cyclododecatriene, and 1,3,5,7 cyclooctatetraene. A particularly preferred non-aromatic, cyclic, unsaturated crosslinking co-agent compound is 1,5,9,-cyclododecatriene.

The co-agent is present in the composition in an amount in the range of from about 0.1% to about 3% by weight of the composition. Preferably, the co-agent is present in the composition in an amount in the range of from about 0.2 to about 2% by weight of the composition. Most preferably, the co-agent is present in the composition in an amount in the range of from about 0.3% to about 1% by weight of the composition.

The ethylene polymer composition preferably contains hydroperoxide scavengers examples of which are those compounds comprising one or more thioester groups. Examples of compounds having a thioester group include dilauryl thiodipropionate and distearyl thiodipropionate. Further examples of such compounds can be found in U.S. Pat. No. 4,028,332 the entire disclosure of which is hereby incorporated by reference.

The antioxidant employed in the composition of the present invention is preferably present in the composition in an amount in the range of from about 0.01% to about 1%, more preferably in the range of from about 0.05 to about 0.5% by weight of the composition. Even more preferably, the antioxidant is present in the composition in an amount in the range of from 0.1% to 0.3% by weight of the composition.

If desired, an antioxidant such as a hindered phenolic antioxidant can be employed in the composition to reduce oxidation of the ethylene polymer. Examples of these antioxidants include 2,6-di-t-butyl-p-cresol (BHT), tetrakis(methylene(3,5-di-t-butyl-4-hydroxyhydrocinnamate)) methane (IRGANOX 1010) and octadecyl-3,5-di-t-butyl-4-hydroxyhydrocinnamate (IRGANOX 1076). When employed, these antioxidants are present in the composition in an amount in the range of from about 0.01% to about 0.05%, more preferably in the range of from 0.01% to 0.03%, by weight of the composition.

The use of the co-agent in the composition tends to make the molded pans stick to the mold. If the degree of adhesion is too great, the parts will be difficult to remove from the mold and may be damaged during extraction. On the other hand, if the degree of adhesion is too low, the parts may separate from the mold prematurely during the molding cycle, resulting in the formation of gas pockets between the pans and the mold. Gas pockets between the parts and the mold typically result in the formation of crater-like defects or "pock marks" on the outside surfaces of the parts. Consequently, a mold release agent is typically used in the ethylene polymer composition. Preferably, the mold release agent employed in the composition is a fatty acid. Fatty acids can be saturated or unsaturated, but saturated fatty acids are preferred. In general, saturated fatty acids have the formula $CH_3(CH_2)_x COOH$ where "X" is an integer from 2 to 24. Examples of saturated fatty acids are butyric, lauric, palmitic and stearic. Examples of unsaturated fatty acids are oleic, linoleic, and linolenic. A preferred fatty acid is stearic acid.

The mold release agent is preferably present in the composition in an amount in the range of from about 0.05% to about 1%, more preferably in the range of from about 0.1 to about 0.5%, by weight of the composition. Most preferable, the mold release agent is present in the composition in an amount in the range of from about 0.1% to about 0.2% by weight of the composition.

If desired, other components which do not adversely affect the crosslinking of the ethylene polymer can be employed in the composition of the present invention. Examples of such components include corrosion inhibitors, pigments, additional stabilizers such as metal complexing agents, antistatic agents, ultraviolet absorbers for light stabilization, carbon black, fillers, reinforcing materials and the like.

The composition of the present invention can be formed by a variety of techniques. For example, the ethylene polymer can be compounded into pellets and fed, along with the other compounds, into an extruder having either a single mixing screw or twin mixing screws. The pellets thus produced may be ground and used in powder form.

EXAMPLES

These examples are provided to further assist a person skilled in the art with understanding this invention. These examples are intended to be illustrative of the invention and are not meant to be construed as limiting the scope of the invention.

The compounds indicated in Table E-1 were contacted together to form a contacted composition. This contacted composition was then contacted with methylene chloride to form a wetted composition. The methylene chloride was then evaporated from the wetted composition to form a residue composition. This evaporation step was accomplished by using a rotary evaporator. The evaporation took approximately five hours. The residue composition was then dried in a vacuum oven overnight at about 35° C. to form a crosslinkable ethylene polymer composition.

TABLE E1

"Ethylene Polymer Compositions"

| Compounds | Sample Number | | | |
|---|---|---|---|---|
| | 1 | 2 | 3 | 4 |
| | Amounts in Grams | | | |
| Ethylene Polymer[1] | 488.65 | 488.65 | 488.65 | 488.65 |
| TAC[2] | 3.5125 | 0 | 0 | 0 |
| TATM[3] | 0 | 3.5018 | 0 | 0 |
| 1,9-Dec[4] | 0 | 0 | 3.5080 | 0 |
| 1,5,9-Cy[5] | 0 | 0 | 0 | 3.5160 |
| 2,5-Di[6] | 3.5034 | 3.5011 | 3.5017 | 3.5034 |
| SA[7] | 0.5007 | 0.5002 | 0.5014 | 0.5020 |
| UV531[8] | 2.5005 | 2.5001 | 2.5009 | 2.5001 |
| DLTDP[9] | 1.3504 | 1.3528 | 1.3503 | 1.3502 |

Table E-1 Notes:
[1]This is an ethylene polymer composition that has a melt index in the range of about 16 to about 22 grams per 10 minutes. It also has a density in the range of about 0.945 to about 0.955 grams per cubic centimeter. This ethylene polymer composition is available from Phillips Petroleum Company under the registered trademark of Marlex FM 55180.
[2]This is triallyl cyanurate also known as 2,4,6 triallyloxy 1,3,5-triazine. Compounds in notes 2–5 are crosslinking co-agents also.
[3]This is triallyl trimesate also known as triallyl 1,3,5-benzenecarboxylate.
[4]This is 1,9-decadiene.
[5]This is 1,5,9-cyclododecatriene.
[6]This is 2,5-dimethyl-2,5-di(tert-butylperoxy)-hexyne-3 it is used as a crosslinking agent.
[7]This is stearic acid it is used primarily as a mold release agent.
[8]This is 2-hydroxy-4-n-octoxybenzophenone, it is also known as Cyasorb UV531. This compound is available from American Cyanamid Company. It is used primarily as an ultraviolet light stabilizer.
[9]This is dilaurylthiodipropionate it is used primarily as an antioxidant.

Sample compositions 1–4 were molded into five inch by five inch by ⅛ inch slabs by using a heated platen press according to the following procedure. Each sample was placed into a picture frame mold of the indicated dimensions. This picture frame mold was inserted between the platens of the press. The platens were at a temperature of about 232° C. Slight pressure (1–50 psig) was then applied from the press for about one minute. The pressure was then raised to thirty tons within one minute. The picture frame mold was subjected to this pressure and temperature for either two or four minutes to allow the crosslinking reaction to proceed. The picture frame mold was then cooled to less than 40° C. at a rate of 27° C. per minute.

Standard ASTM test bars were cut from the molded and crosslinked ethylene polymer compositions. The test bars were then measured for their tensile properties according to ASTM D638. The results are presented in Table E-2.

TABLES E-2 A-D

"Tensile Properties of the Ethylene Polymer Composition Samples"

| Run | Crosslinking Time | Test 1[1] | Test 2[2] |
|---|---|---|---|
| TABLE E-2A SAMPLE ONE | | | |
| 1 | 2 | 134.67 | 2906 |
| 2 | 2 | 472.67 | 9843 |
| 3 | 2 | 146.00 | 3074 |
| 4 | 2 | 142.00 | 3058 |
| 5 | 2 | 131.33 | 2829 |
| | Mean | 205.33 | 4342 |
| | Standard Deviation | 149.56 | 3077 |
| | Consistency Factor[3] | 73% | 71% |
| 6 | 4 | 166.00 | 3505 |
| 7 | 4 | 88.00 | 1984 |
| 8 | 4 | 103.33 | 2298 |
| 9 | 4 | 364.00 | 7472 |
| 10 | 4 | 81.33 | 1814 |
| | Mean | 160.53 | 3415 |
| | Standard Deviation | 118.57 | 2363 |
| | Consistency Factor | 74% | 69% |
| TABLE E-2B SAMPLE TWO | | | |
| 11 | 2 | 687.33 | 15701 |
| 12 | 2 | 527.33 | 11197 |
| 13 | 2 | 685.33 | 15640 |
| 14 | 2 | 687.33 | 15941 |
| 15 | 2 | 688.00 | 16017 |
| | Mean | 655.06 | 14899 |
| | Standard Deviation | 71.41 | 2076 |
| | Consistency Factor[3] | 11% | 14% |
| 16 | 4 | 523.33 | 11236 |
| 17 | 4 | 613.33 | 13450 |
| 18 | 4 | 597.33 | 13204 |
| 19 | 4 | 704.67 | 16273 |
| 20 | 4 | 739.33 | 17833 |
| | Mean | 635.60 | 14399 |
| | Standard Deviation | 86.74 | 2629 |
| | Consistency Factor | 14% | 18% |
| TABLE E-2C SAMPLE THREE | | | |
| 21 | 2 | 888.67 | 22106 |
| 22 | 2 | 584.67 | 12392 |
| 23 | 2 | 550.67 | 11545 |
| 24 | 2 | 452.67 | 9346 |
| 25 | 2 | 534.00 | 11142 |
| | Mean | 602.14 | 13306 |
| | Standard Deviation | 167.36 | 5043 |
| | Consistency Factor[3] | 28% | 38% |
| 26 | 4 | 448.00 | 9330 |
| 27 | 4 | 518.00 | 10882 |
| 28 | 4 | 476.67 | 9911 |
| 29 | 4 | 528.00 | 11040 |
| 30 | 4 | 560.67 | 11725 |
| | Mean | 506.27 | 10578 |
| | Standard Deviation | 44.27 | 952 |
| | Consistency Factor | 9% | 9% |
| TABLE E-2D SAMPLE FOUR | | | |
| 31 | 2 | 398.00 | 8053 |
| 32 | 2 | 404.00 | 8190 |
| 33 | 2 | 406.67 | 8374 |
| 34 | 2 | 400.67 | 8154 |
| 35 | 2 | 416.67 | 8477 |
| | Mean | 405.20 | 8250 |
| | Standard Deviation | 7.20 | 172 |
| | Consistency Factor[3] | 2% | 2% |
| 36 | 4 | 368.00 | 7511 |
| 37 | 4 | 434.67 | 8980 |
| 38 | 4 | 385.33 | 7828 |
| 39 | 4 | 394.00 | 7991 |
| 40 | 4 | 392.00 | 7842 |
| | Mean | 394.80 | 8030 |
| | Standard Deviation | 24.53 | 559 |
| | Consistency Factor | 6% | 7% |

Table E-2 Notes:

[1] This is the "Percent Elongation at Break" it is a good indicator of the brittleness of an ethylene polymer composition.

[2] This is the "Strain energy at Break" it is a good indicator of the toughness of an ethylene polymer composition. It is equivalent to the total area under the stress-strain curve. The unit of measurement is pounds per square inch.

[3] This is the consistency factor. It is equal to the standard deviation divided by the mean. It gives an indication of how consistent the measured property is from sample run to sample run.

It can be seen from Tables E-2 A–D that the nonaromatic cyclictriene compound had the best overall consistency in test one. This is an unexpected and important result. This result is important because the Percent Elongation at Break is a good indicator of the brittleness of an ethylene polymer composition. Furthermore, in this sample, the brittleness of each ethylene polymer sample did not vary by an unacceptable amount thereby providing an ethylene polymer composition that is better from a quality control viewpoint.

It can be seen from Tables E-2 A–D that the nonaromatic cyclictriene compound had the best overall consistency in test two. This is an unexpected and important result. This result is important because the Strain Energy at Break is a good indicator of the toughness of an ethylene polymer composition. Furthermore, in this sample, the toughness of each ethylene polymer sample did not vary by an unacceptable amount thereby providing an ethylene polymer composition that is better from a quality control viewpoint.

Although the present invention has been described in detail with reference to certain preferred versions thereof, other versions are possible. Therefore, the spirit and scope of the appended claims should not be limited to the description of the preferred version contained herein.

That which is claimed:

1. An ethylene polymer composition that comprises:
   (a) an ethylene polymer selected from the group consisting of ethylene homopolymers and ethylene copolymers or mixtures thereof, wherein said ethylene polymer has a density in the range of about 0.92 g/cm to about 0.98 g/cm and a melt index of at least 5 dg/minute and that comprises a chloride amount of less than 20 parts per million by weight based on the weight of the ethylene polymer;
   (b) a crosslinking agent; and
   (c) a nonaromatic, cyclic, unsaturated, crosslinking co-agent.

2. A composition according to claim 1 wherein said ethylene polymer has a density from about 0.94 g/cm$^3$ to about 0.97 g/cm$^3$ and a melt index from about 10 dg/minute to about 30 dg/minute.

3. A composition according to claim 2 wherein said crosslinking co-agent that has the general formula $C_nH_{2(n-x)}R$ where "n" is an integer from 4 to 60; "x" is an integer from 1 to (n−1) and "x" is the number of unsaturated carbon-carbon double bonds; and R can be any group that does not interfere with the crosslinking reaction.

4. A composition according to claim 3 wherein said crosslinking co-agent is selected from the group consisting of cyclopentene, cyclohexene, cycloheptene, cyclooctene, cyclononene, cyclodecene, 1,3-cyclohexadiene, 1,4-cyclohexadiene, 1,3-cycloheptadiene, 1,5-cyclooctadiene, 1,5-cyclononadiene, dicyclopentadiene, cycloheptatriene, 1,5,9-cyclododecatriene, 1,3,5,7 cyclooctatetraene and mixtures thereof.

5. A composition according to claim 4 wherein said crosslinking co-agent is 1,5,9 cyclododecatriene.

6. A composition according to claim 1 wherein said ethylene polymer is a copolymer that comprises an alpha-olefin from 3 to 18 carbon atoms.

7. A composition according to claim 6 wherein said alphaolefin is selected from the group consisting of 1-butene, 3-methyl-1-butene, 1-pentene, 3-methyl-1-pentene, 4-methyl-1-pentene, 1-hexene, 3-ethyl-1-hexene, 1-heptene, 1-octene, 1-nonene, 1-decene and mixtures thereof.

8. A composition according to claim 7 wherein said ethylene copolymer has a density from about 0.94 g/cm$^3$ to about 0.97 g/cm$^3$ and a melt index from about 10 dg/minute to about 30 dg/minute.

9. A composition according to claim 8 wherein said ethylene copolymer has a crosslinking co-agent that has the general formula $C_nH_{2(n-x)}R$ where "n" is an integer from 4 to 60; "x" is an integer from 1 to (n−1) and "x" is the number of unsaturated carbon-carbon double bonds; and R can be any group that does not interfere with the crosslinking reaction.

10. A composition according to claim 9 wherein said crosslinking co-agent is 1,5,9 cyclododecatriene.

* * * * *